SMITH GARDNER.
Clutch for Supporting Water-Bowls under Gas-Burners.
No. 127,590. Patented June 4, 1872.
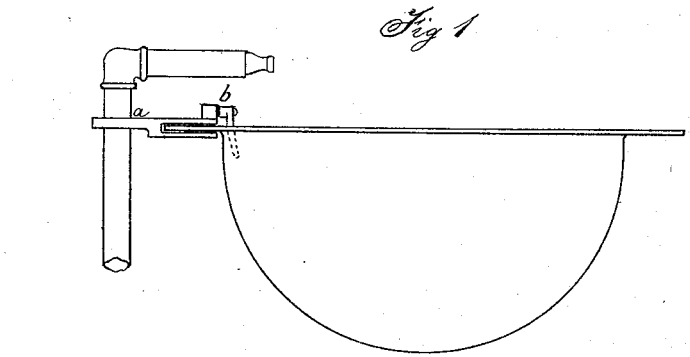
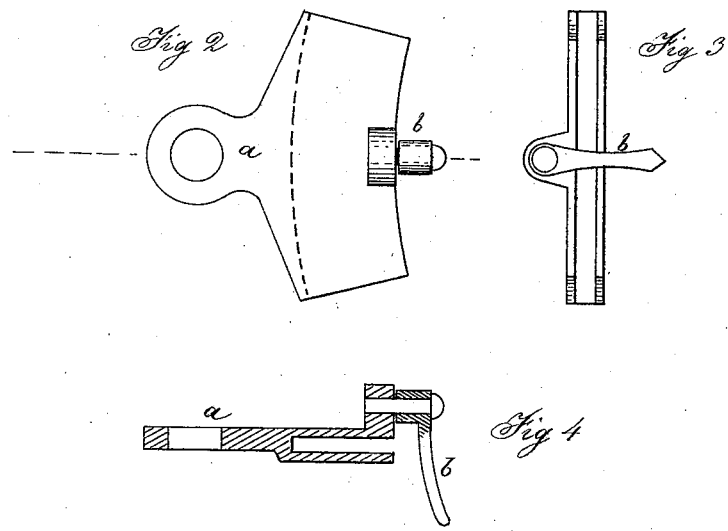
Witnesses.
Albert H. Hook
William A. Collins
Inventor
Smith Gardner 127,590

UNITED STATES PATENT OFFICE.

SMITH GARDNER, OF NEW YORK, N. Y.

IMPROVEMENT IN CLUTCHES FOR SUPPORTING WATER-BOWLS UNDER GAS-BURNERS.

Specification forming part of Letters Patent No. 127,590, dated June 4, 1872.

I, SMITH GARDNER, of the city and State of New York, have invented an apparatus which I call a Clutch for Supporting Water-Bowls under Gas-Burners, which is an improvement on any device ever before known or used for such purpose, and which the following specification and accompanying drawing fully explain.

Figure 1 is a side view of a bowl, on a reduced scale, supported under a horizontal burner by my improved apparatus or clutch. Fig. 2 is a plan view of the clutch, which is in the form of a segment of a circle, having on its crown or apex an ear, a, bored to fit the end of a gas-pipe under the burner. The inner circle or concave edge of the clutch is grooved to receive and hold the bowl by the rim, as shown in Fig. 1. Fig. 3 is a front view of the same, and Fig. 4 a vertical section thereof. Figs. 2, 3, and 4 are shown full size.

b is a guard designed to prevent the bowl from being accidentally thrown out of the clutch. It hangs on the end of a pin, which is attached to the clutch and extends down a short distance into the bowl, as shown in Fig. 1. It is movable on the pin, and can be turned up out of the way when it becomes necessary to remove the bowl from the clutch.

I claim as my invention—

1. The grooved clutch, constructed substantially as and for the purpose set forth.
2. The guard b appended to the clutch, substantially as described, and for the purpose specified.
3. The combination of the grooved clutch and guard b in the manner and for the purpose set forth.

SMITH GARDNER.

Witnessed by—
 DANIEL WORTHEN,
 HENRY DAKER.